United States Patent [19]

Renz

[11] Patent Number: 4,457,559
[45] Date of Patent: Jul. 3, 1984

[54] FASTENING ARRANGEMENT FOR WHEEL COVERS

[75] Inventor: Udo D. Renz, Rechberghausen, Fed. Rep. of Germany

[73] Assignee: Daimler-Benz Aktiengesellschaft, Stuttgart, Fed. Rep. of Germany

[21] Appl. No.: 312,897

[22] Filed: Oct. 19, 1981

[30] Foreign Application Priority Data

Oct. 17, 1980 [DE] Fed. Rep. of Germany ....... 3039219

[51] Int. Cl.³ .............................................. B60B 7/06
[52] U.S. Cl. ................................ 301/37 P; 301/37 R; 301/37 PB
[58] Field of Search ............... 301/37 R, 37 P, 37 ST, 301/37 TC, 37 T, 37 C, 37 CD, 37 TP, 37 PB, 37 S, 108 R, 108 A; 29/159 A

[56] References Cited

U.S. PATENT DOCUMENTS

| | | | |
|---|---|---|---|
| 2,675,272 | 4/1954 | Hautau | 301/37 R |
| 2,694,604 | 11/1954 | Gabardi | 301/37 R |
| 3,575,468 | 4/1971 | Kapanka | 301/37 R |
| 3,747,984 | 7/1973 | Andrews et al. | 301/37 P |
| 4,247,152 | 1/1981 | Brown | 301/37 P X |

FOREIGN PATENT DOCUMENTS

| | | | |
|---|---|---|---|
| 2651964 | 5/1978 | Fed. Rep. of Germany | 301/307 R |
| 840370 | 4/1939 | France | 301/37 R |
| 55-79703 | 6/1980 | Japan | 301/37 P |

Primary Examiner—Charles A. Marmor
Attorney, Agent, or Firm—Craig & Burns

[57] ABSTRACT

An arrangement for attaching wheel covers to a rim of a wheel, with the attachment being achieved by means of a catch or clamp and servo spring elements secured to the wheel cover. The spring element is constructed as a U-shaped bow member having legs which extend in an axial direction, a bridge connecting the legs with the connecting bridge extending in a circumferential direction, and a bulge formed on part of the connecting bridge with the bulge extending radially relative to the wheel cover.

11 Claims, 5 Drawing Figures

FASTENING ARRANGEMENT FOR WHEEL COVERS

BACKGROUND OF THE INVENTION

The present invention relates to an attaching arrangement and, more particularly, to a spring element for attaching wheel covers to rims of a vehicle whereby the fastening takes place by snap-in action and the spring elements are secured at the wheel cover.

It is known in the prior art to secure wheel covers which cover a wheel rim, on the wheel rim by snap-in action. Thus, it is known, for example, from the German Gebrauchmuster 1,975,618 that retaining springs detachably secured at the wheel cover are formed by sheet metal strips which can be suspended in the axial direction in the rear area of the wheel cover and take over the retention of the wheel cover by means of a bulge-like part forming the rear part of the spring. The sheet metal strip is made with a longer and a shorter leg, whereby the longer upwardly pointing leg cooperates with the outer edge of the wheel cover bent in the rearward direction and the shorter, downwardly bent leg includes a tab or lug which is also suspended at the wheel cover in a bend.

A disadvantage of the aforementioned prior art construction resides in the fact that manufacturing the strips for forming the springs is relatively expensive from a material point of view since, in a circumferential direction, the springs must extend over a certain width in order to be able to ensure an adequate spring constant.

A further disadvantage of the aforementioned prior art construction resides in the fact that the springs cannot be used for attaching wheel covers to rims having a considerable axial depth because the lever distance which occurs thereby between the attachment point of the clip or tongue-like member and the seat of the bulge of the spring establishing the connection becomes so large that the spring force becomes diminished to a point where it is ineffective in its ability to reliably secure the wheel cover.

Yet another disadvantage of the aforementioned prior art sheet steel spring elements resides in the fact that, with such elements, it is no longer possible to influence the spring travel and therewith the hardness or stiffness of the spring system once the sheet metal spring member has been made. Consequently, if different spring constants are desired, different strips of sheet steel with appropriate desired spring constants must be produced.

It has also been found as a disadvantage with this prior art construction that the retaining springs must exert relatively large forces with respect to the wheel cover and/or the wheel rim for reasons of manufacturing tolerances and of different coefficients of thermal expansions of the parts used for the manufacture, if a secure retention of the wheel cover at the rim is to be assured in every case.

Fastening systems for wheel covers are also known (German Offenlegungsschrift 2,622,908) in which a radially springy wire ring is provided for fastening the wheel cover. However, the relatively large manufacturing expenditure for the wheel cover and wire ring is disadvantageous with such types of construction. Added thereto is the fact that a sufficiently large structural volume in the radial direction must be available to such a wire ring in order to be able to fulfill its function. Such wire rings cannot be used, therefore, in particular in those cases in which the structural volume necessary therefor is not available by reason of constructive features, for example, relatively large pressed-in depths of the wheel dish.

SUMMARY AND OBJECTS OF THE INVENTION

The aim underlying the present invention essentially resides in providing spring elements for attaching wheel covers on wheels, which can be used for fastening of wheel covers on wheels with different wheel rim contour, which can exhibit a soft spring characteristic without large radial travels, are constructed, space-savingly, can be manufactured in a simple and inexpensive manner, and can assure a reliable seating of the wheel covers.

The present invention essentially consists in that the spring element is constructed as U-shaped wire member whose legs which are connected by way of a connecting web extending in the circumferential direction, extend in the axial direction.

As a result of this construction in accordance with the present invention, a spring element is created adapted to be manufactured by means of a spring wire, which essentially consists of a U-shaped curved bow-like wire member that is secured at the wheel cover pointing in the axial direction. The U-shaped bow-like wire member includes two legs extending in the axial direction which are connected with each other by way of a connecting web extending in the circumferential direction. Though the force-loading or stressing of the spring element takes place in the radial direction at the connecting web, these forces are transmitted in an axial direction by way of the legs so that no large structural volume in the radial direction must be made available. The connecting web may be provided with a radially outwardly directed bulge portion for absorbing these forces, on which the abutment pressure is then exerted. Mounting webs may adjoin the wire member of such a spring element in accordance with the present invention which also extend in the axial direction, i.e., in parallel to the legs of the curved wire member, with the aid of which the spring element may be secured at the wheel cover.

In accordance with further features of the present invention, two or more spring elements may be combined into one spring element, with straight lines extending in a circumferential direction connecting the spring elements and thereby enclosing a cardan angle between the curved bow-like wire members. In this connection, the cardan angle is to be understood as an angle which two imaginary straight lines through end points of the legs of two adjacent curved wire members form with one another. This particular arrangement ensures that every spring element need not be inserted individually.

Advantageously, the angle may be matched to the diameter of a rim or the wheel cover and, in case of radially inwardly directed displacements of the connecting bridges, effects a deformation of the connecting piece between the curved bow-like members, whereby a reaction force is produced which may perform the function of the curved bow-like retention members which may be omitted. As the displacement of the connecting bridge increases, the reaction force effects a motion of the connecting piece which is radially outwardly directed as well as an expanding of the curved bow-like wire members in the circumferential direction.

It is advantageous in accordance with the present invention, for displacement or travel of the connecting piece to be limited radially inwardly by stops or abutments provided at the webs of the wheel cover. The spring characteristics of the curved wire members may be influenced by this limitation in that the connecting piece rests at the stops or abutments during the assembly of the spring element into the wheel cover, as a result of which a pre-stressed condition is attained since the stops serve as support points.

It is possible to exert a further influence on the spring characteristic of the spring elements in that the travel or displacement of the connecting piece is limited radially outwardly, with the effect of such an arrangement that the spring force existing as a result of the bending of the connecting piece, which points radially outwardly, acts fully on the bulge portions in the connecting webs of the curved wire member which extend in the circumferential direction.

The limiting of the spring unit in the radial direction may however also be achieved by providing stops or abutments within the area of the axiallypointing retaining webs of the curved members, which limit the spring path of the curved wire members radially outwardly. As a result thereof, the spring travel necessary for the build-up of a sufficient spring force is fixed so that only a small residual spring path has to be bridged for the assembly of the wheel cover at the wheel. This permits a very soft spring rate which can be attained with small wire cross-sections and therewith with light-weight spring elements.

In accordance with further advantageous features of the present invention, the spring element stresses a clip coordinated to the wheel cover by means of the radially outwardly directed bulge. The clip which is preferably made of a plastic material may be an integral part of the wheel cover and is thus located at the point of abutment between the bulge at the connecting bridge and the wheel rim. The clip may advantageously prevent metal parts of the assembly from coming into contact with one another thereby suppressing rattling noises and preventing the occurrence of corrosion.

In order to facilitate an insertion of the wheel cover in the rim of the wheel, a clip is advantageously provided with an inclined assembly surface at the end thereof which faces toward the rim of the wheel. The axial forces which necessarily occur when the wheel cover is mounted are thus divided into force components which are directed radially inwardly and outwardly and thus act on the spring unit thereby facilitating the snapping-in or clamping of the wheel cover on the wheel rim.

It is also advantageous if several spring elements are combined into an integral annular spring unit and are welded together at a butting place. This construction offers the advantage that the spring elements do not need to be individually secured at the wheel cover but rather, since they are arranged together as an annular spring, the spring elements may be attached to the wheel cover as a unit. The annular spring element may be designed in such a manner that no support forces of the spring element act on the wheel cover in the operating condition of the wheel cover, i.e., when the wheel cover is installed at the wheel.

Accordingly, it is an object of the present invention to provide a spring arrangement for attaching wheel covers onto rims of wheels which avoids, by simple means, shortcomings and disadvantages encountered in the prior art.

Another object of the present invention resides in providing a spring arrangement for attaching wheel covers onto wheel rims which enable the use of spring elements having soft spring characteristics.

Yet another object of the present invention resides in providing a spring arrangement for attaching wheel covers to rims of a wheel which ensures a reliable seating or mounting of the wheel covers on the wheel rim.

A still further object of the present invention resides in providing a spring arrangement for attaching wheel covers to rims of wheels which is compact and simple in construction and therefore relatively inexpensive to manufacture.

These and other objects, features and advantages of the present invention will become more apparent from the following description when taken in connection with the accompanying drawing which shows, for the purposes of illustration only, several embodiments in accordance with the present invention, and wherein:

BRIEF DESCRIPTON OF THE DRAWINGS

DESCRIPTION OF THE PREFERRED EMBODIMENTS

Figure 1:
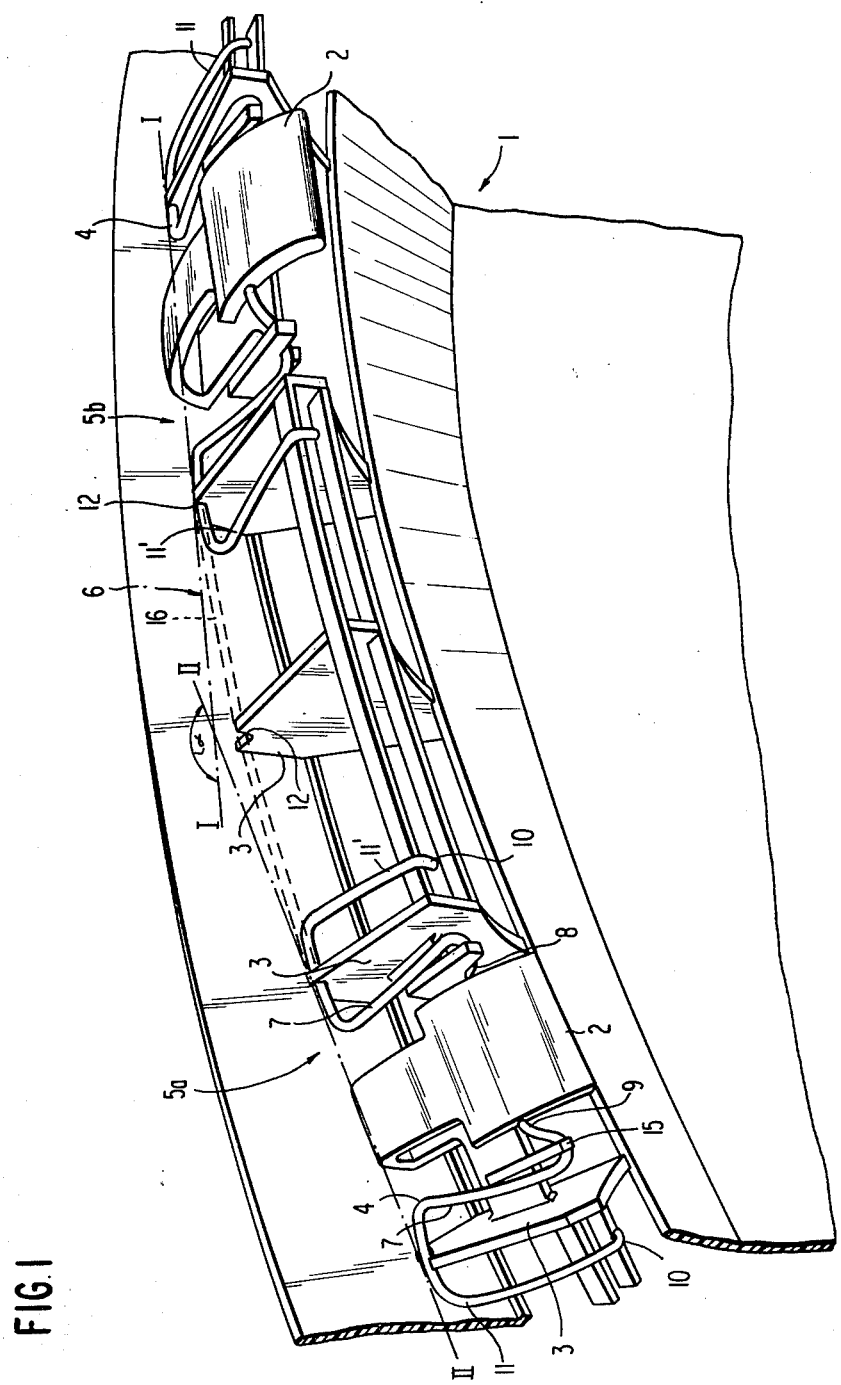
FIG. 1 is a perspective view of a part of a wheel cover equipped with spring elements constructed in accordance with the present invention.

Referring now to the drawings wherein like reference numerals are used throughout the various views to designate like parts and, more particularly, to FIG. 1, wherein according to this Figure, a wheel cover generally designated by the reference numeral 1 is adapted to be mounted on wheels of, for example, a motor vehicle so as to cover an opening in the rim thereof. The mounting of the wheel cover 1, only a portion of which is shown in FIG. 1, takes place customarily by snap-in action which, in accordance with the present invention, may be accomplished by way of clips 2 stressed by spring elements. The clips 2 are preferably made together with the wheel cover 1 essentially extending in an axial direction and are constructed as radially elastic or springy elements. To stress the clips 2, spring elements generally designated by the reference numerals 5a, 5b are provided which are constructed as U-shaped wire bows and extend on the wheel cover 1 in an essentially axial direction. The spring elements 5a, 5b include curbed bow-like wire members 4, each of which have two legs 7 which extend in an axial direction and are interconnected by a connecting web 8 which extends in the circumferential direction.

Figure 2:
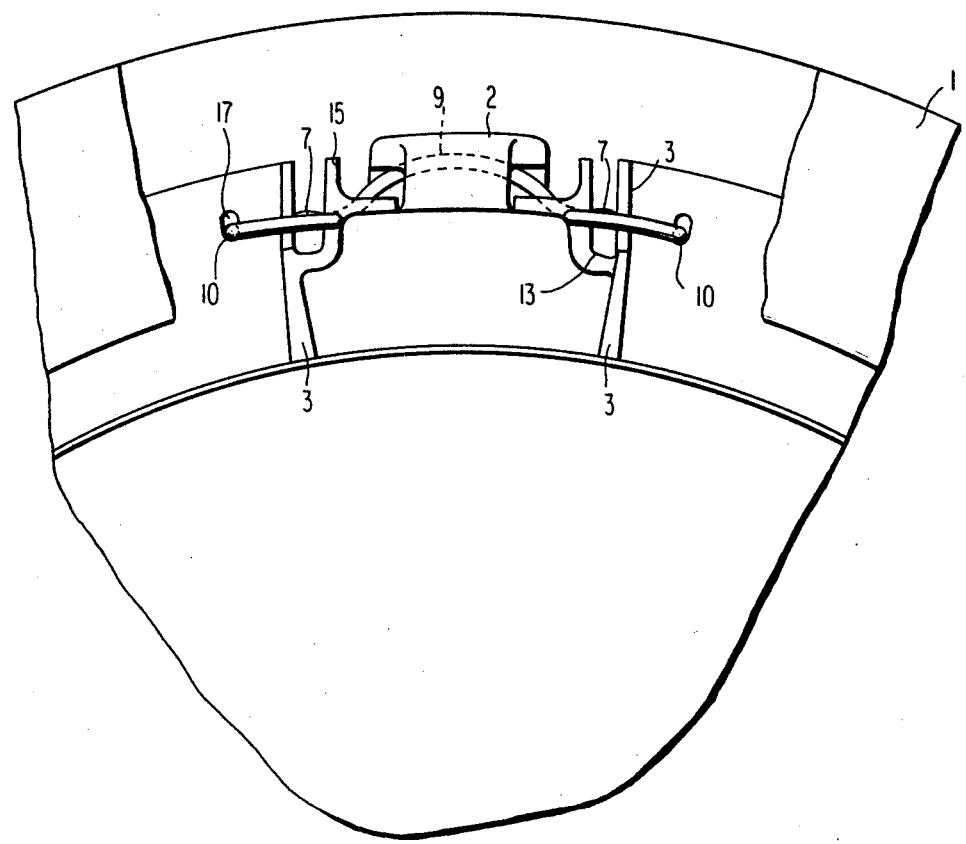
FIG. 2 is a side view of the spring element of FIG. 1 together with a part of a wheel cover.

As shown most clearly in FIG. 2, the connecting web 8 may be provided with a radially outwardly pointing or extending bulge 9 which acts upon and thereby stresses the clip 2. The spring elements 5a, 5b also include two outer retention webs 11' which are secured at their ends 10 in the radial direction at the wheel cover 1. In the illustrated embodiment, the clip 2 is located between two axially extending webs 3 which simultaneously serve to guide the curved bow-like wire members 4 in a circumferential direction when stressed. The spring effect in such a spring element occurs in that the clip 2 transmits a force acting on the same onto the bulge 9 of the curved bow-like wire member 4. As a result thereof, the counterforce of the spring element increases because the latter is radially fixed with its retention webs 11.

The spring elements 5a, 5b of FIG. 1 may be manufactured very easily and inexpensively and may also be used for wheels which have a rim requiring a large insertion depth since the clip is stressed directly by the spring element 5a, 5b and very little space is required in a radially inward direction. A connecting line, indicated in phantom in FIG. 1, illustrates the manner in which the two spring elements 5a, 5b, whose respectively facing retention webs 11' are then omitted, may be combined into a spring element by means of a connecting piece 16. In this case, the connecting piece 16 is guided by stops or abutments 12 which are provided at the webs 3. The connecting piece 16 is designed in such a manner that the extension of the swivel or pivot axes I—I and II—II of the curved bow-like wire parts 4 of the spring elements 5a, 5b form a cardan angle $\alpha$ so that with radially inwardly directed spring travels of the curved bow-like connecting webs 8, the connecting piece 16 is elastically deformed. The effect of this deformation is that the connecting piece 16 moves a certain distance radially outwardly and a reaction force on the curved bow-like connecting webs 8 is produced. Because of the radially outward direction of motion of the connecting piece 16, the curved connecting web 8 is expanded in a circumferential direction and thus contributes to generating a spring force.

Because of the shape and matching of the stops 12 to the spring elements 5a, 5b, it is possible to further affect the spring characteristics. More particularly, this can be accomplished by having the stop 12 limit the deformation travel or displacement of the connecting piece 16 radially inwardly. In this manner, when the spring element 5a, 5b is installed in the wheel cover 1, a deformation condition corresponding to the operating condition of the wheel cover 1 is imposed on the connecting piece 16, i.e., the spring element 5a, 5b is prestressed and thus acquires a progressive spring characteristic. A limitation of the radially outwardly directed motion of the connecting piece 16, which is not shown in the figures, significantly restricts the elastic deformation thereof so that no expanding or opening of the curved wire members 4 in a circumferential direction will occur any longer. Thus, if desired, this arrangement can ensure a further progression in the spring characteristics of the spring elements 5a, 5b.

The radially outwardly directed spring travel of the curved wire member 4 can be limited by additional stops or abutments. The spring element can thus be pre-stressed, i.e., the spring travel necessary for build-up of the necessary spring force is realized already during the installation of the spring element into the cover in that the pre-stressed force of the curved wire members is supported at the correspondingly constructed abutments of the cover. Only a small residual spring travel or distance then has to be bridged during the mounting and installation of the cover at the wheel in order to achieve a secure seating. This construction permits the use of spring elements with soft spring characteristics, i.e., the use of small wire cross-sections and therewith light-weight spring elements. The relatively flat (soft) spring characteristic curve produces relatively small spring force fluctuations with relatively large spring travel changes as a result of tolerances and thermal expansion influences. Very uniform spring forces will result therefrom.

It can be seen from the section illustrated in FIG. 2 of a rim with a spring element according to the present invention that the ends 10 of the retaining webs 11 engage in bores 17 which are provided in the wheel cover, and have thereat only a slight play or clearance in the radial direction. This has as a consequence, as mentioned already above, that the spring force is produced essentially by an increase of the mouth or opening width of the curved bow-like wire member 4, which takes place in the circumferential direction, and which is of advantage in particular if, spatially constricted, during the installation of the wheel cover only little space is available for the spring elements in the radial direction and, therefore, no ways are available for the expansion or reduction of the distance between the axis and the seat of the spring element 5a, 5b. The construction of the abutments 15 effect that the two legs 7 of the spring elements 5a, 5b are securely guided and that additionally the travel thereof in the circumferential direction between the abutments 15 and web 3. The spring travel of the curved bow-like wire members 4 may be additionally limited radially inwardly by additional abutments, as can also be seen in FIG. 2.

Figure 3:
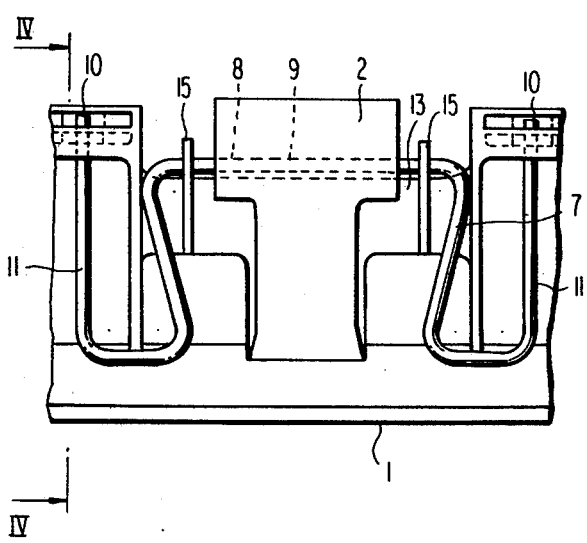
FIG. 3 is a top view of the spring element of FIG. 1 secured to the wheel cover.
Figure 4:
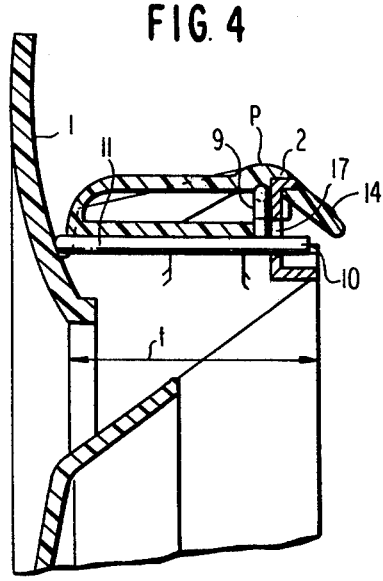
FIG. 4 is a cross sectional view taken along the line IV—IV in FIG. 3.

It can be seen in the cross-section along line IV—IV of FIG. 3, as shown in FIG. 4, that the spring elements extend at the ends 10 through a bore 17 which acts as radial stop. The bulge portion 9 engages at the clip 2 from below. The clip 2 is provided in its end pointing toward the rim (not shown in FIG. 4) with an inclined assembly surface 14 which facilitates an insertion because axial forces occurring during the installation are decomposed into components that also point in the radial direction, as a result of which the spring element is then stressed during the insertion operation. Depending on the depth t of the rear area of the wheel cover, a wheel cover having such spring elements can be used reliably and safely for rims of different depths, since the pressure application of a retaining element takes place in a radial direction below the point P at which the wheel cover abuts at the rim.

Figure 5:
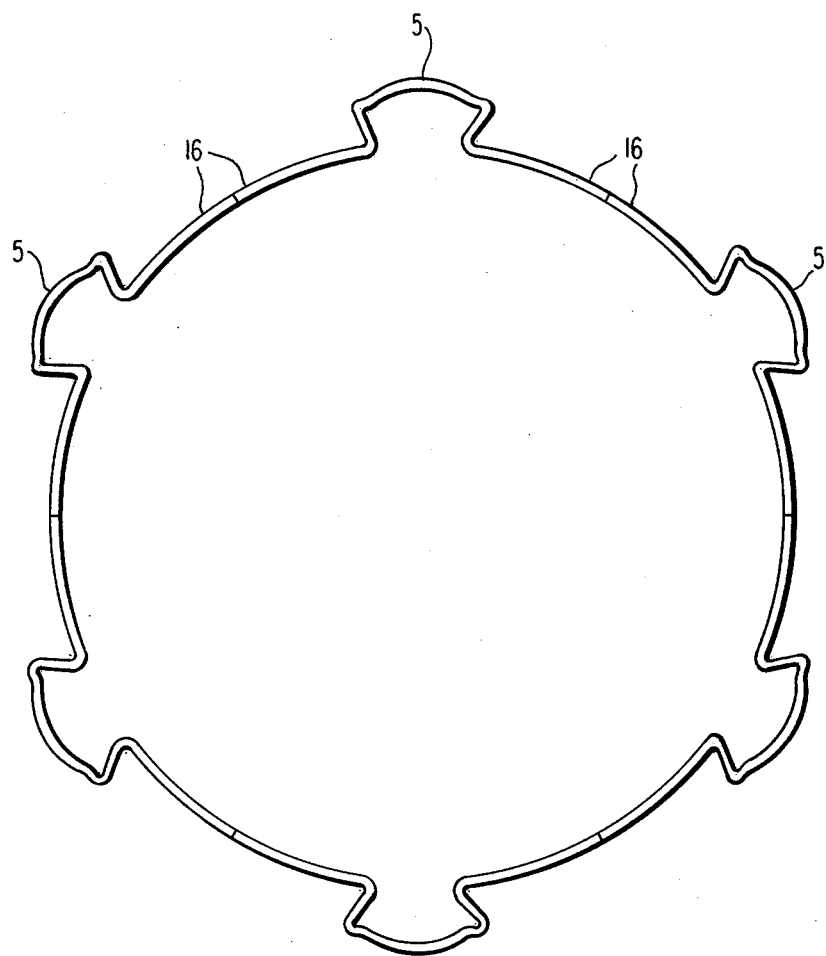
FIG. 5 is a plan view of another embodiment of a spring element constructed in accordance with the present invention wherein the spring elements are combined into a spring ring by means of connecting pieces.

The spring elements according to the present invention can also be combined in a simple manner into a spring ring by way of several connecting pieces 16 as is shown in FIG. 5. In that case, the spring elements then have no longer any retaining webs 11 but are constructed as one-piece support ring that is then provided with the curved bow-like wire members pointing in the axial direction and is welded together at a place. However, the closing at the butting place of such a ring-shaped spring unit could also take place by way of clips or sleeves. This construction entails the advantage that the spring elements need not be inserted individually during the installation, but can be mounted on the rim as a unit. The radial fixing of the connecting pieces 16 can then take place in a similar manner by way of the webs 3, whereby in addition to the abutments 12 illustrated in FIG. 1, additionally upper abutments may be provided at the webs 3 which delimit the spring travel of the connecting pieces 16 radially outwardly. The abutments 12 may be so constructed that in the operating condition of the cover no support forces of the support ring are exerted on the cover made primarily of plastic material.

While I have shown and described only two embodiments in accordance with the present invention, it is understood that the same are not limited thereto but are susceptible of numerous changes and modifications as known to a person skilled in the art, and I therefore do not wish to be limited to the details shown and described herein but intend to cover all such changes and modifications as are obvious to one of ordinary skill in the art.

I claim:

1. A wheel cover fastening arrangement for motor vehicles, comprising clip means for supporting said cover, and spring elements of a basic U-shape, the legs of each spring element of U-shape extending generally axially with respect to the wheel cover and the legs of a respective spring element being connected with each other at their ends away from the wheel cover, by way of a crosspiece extending in the circumferential direction, said crosspiece being curved radially toward the outside and being supported in a radially springy manner by said legs which pass over at their ends that are away from said crosspiece, into supporting sections, said supporting sections secured extending in the circumferential direction and toward opposite sides and having a holding effect in the axial as well as radial direction, characterized in that radially outer abutments are coordinated to the spring elements in the area of the crosspieces and radially inner abutments on the cover are coordinated to the spring elements in the area of the supporting sections, that supporting arms adjoining the supporting sections and extending at an angle to said supporting sections are provided, said supporting arms being supported in the area of their ends on the cover opposite the spring forces, and that the crosspiece of each spring element is so arranged as to abut at an underface of a respective clip means.

2. An arrangement according to claim 1, wherein said crosspiece is formed as a radially outwardly projecting bulge portion.

3. An arrangement according to claim 1, wherein the ends of the spring elements are secured in the wheel cover against movement in a radial direction.

4. An arrangement according to claim 2, wherein the radially outwardly projecting bulge portion is arranged so as to abut the underface of the respective clip means.

5. An arrangement according to claim 1, wherein said outer abutments limit radially outward movement of the spring elements.

6. An arrangement according to claim 1, wherein the clip means terminate in inclined assembly surfaces facing the rim of the wheel.

7. A wheel cover fastening arrangement for motor vehicles, comprising a plurality of spring means, each spring means being generally U-shaped and having a pair of legs and a connecting portion, said legs extending generally axially with respect to the wheel cover and each of the legs having an end generally extending away from the wheel cover, said connecting portion forming a connecting bridge means extending between the legs in a generally circumferential direction relative to the wheel cover, said connecting bridge means including a portion curved radially outwardly with respect to the wheel cover and being supported by the legs in a radially springy manner, the legs of a respective spring means passing over at their ends away from the corresponding connecting bridge means into supporting sections which extend generally circumferentially relative to the wheel cover and have a holding effect axially as well as radially relative to the cover, radially outer stops disposed on the cover generally in the area of each connecting bridge means, and a plurality of clip means for supporting said cover corresponding in a number to said plurality of spring means and extending at an angle relative to said cover, each said clip means, in the area of each of its end, being biased relative to the cover by the spring forces of a respective spring means associated therewith.

8. An arrangement according to claim 7, wherein each connecting bridge means is formed as a radially outwardly projecting bulge portion.

9. An arrangement according to claim 7, wherein the ends of each of the spring means are secured in the wheel cover against movement in a radial direction.

10. An arrangement according to claim 8, wherein each radially outwardly projecting bulge portion is arranged so as to engage the clip means from below.

11. An arrangement according to claim 7, wherein each of the clip means terminates in an inclined assembly surface facing the rim of the wheel.

* * * * *